Aug. 24, 1926.

J. MASSOLLE ET AL 1,597,323

DIFFERENTIAL MODULATOR

Filed March 30, 1921   3 Sheets-Sheet 1

INVENTORS:
JOSEPH MASSOLLE
HANS VOGT
JOSEF ENGL
BY
ATTORNEYS

INVENTORS:
JOSEPH MASSOLLE
HANS VOGT
JOSEF ENGL
ATTORNEYS

Aug. 24, 1926.

J. MASSOLLE ET AL 1,597,323

DIFFERENTIAL MODULATOR

Filed March 30, 1921   3 Sheets-Sheet 3

INVENTORS:
JOSEPH MASSOLLE
HANS VOGT
JOSEF H. ENGL
ATTORNEYS

Patented Aug. 24, 1926.

1,597,323

UNITED STATES PATENT OFFICE.

JOSEPH MASSOLLE, OF BERLIN-GRUNEWALD, HANS VOGT, OF BERLIN-WILMERSDORF, AND JOSEF ENGL, OF BERLIN-GRUNEWALD, GERMANY, ASSIGNORS TO TRI-ERGON LIMITED, OF ZURICH, SWITZERLAND.

DIFFERENTIAL MODULATOR.

Application filed March 30, 1921, Serial No. 457,137, and in Germany March 3, 1919.

For the transformation of acoustic vibrations into electric vibrations of similar characteristics, granular microphones have hitherto been used almost exclusively. These give, when small amounts of energy are involved, relatively good reproductions of acoustic vibrations (speech, etc.). They have, however, the disadvantage that they produce sounds of their own which become very disturbing, especially when amplified.

The present invention has for an object the provision of connections which permit the influencing of high-frequency energy in the rhythm of acoustic vibrations in a faithful manner.

Another object of the invention is the provision of arrangements such that alternating currents differing in phase from each other will flow in a pair of similar circuits, these two circuits being coupled to a third circuit in such a manner that a resultant current will normally flow in the third circuit, together with means for varying the phase difference between the currents in the first two circuits in a desired manner so as to correspondingly alter the current in the third circuit.

In order that the invention may be clearly understood, we will proceed to describe the same with reference to the forms of construction shown by way of example in the accompanying drawing, wherein:—

Figure 1:
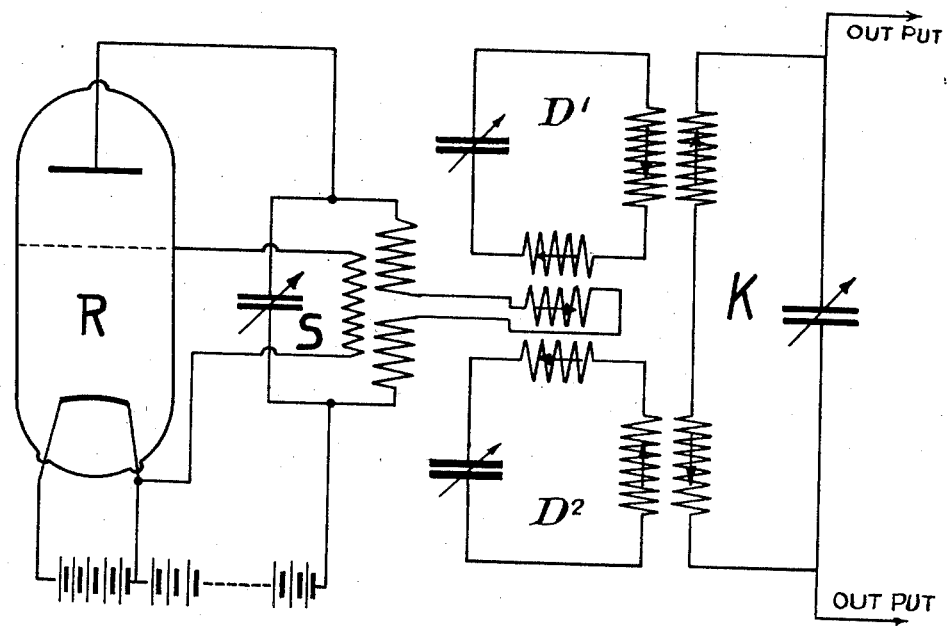
Figure 2:
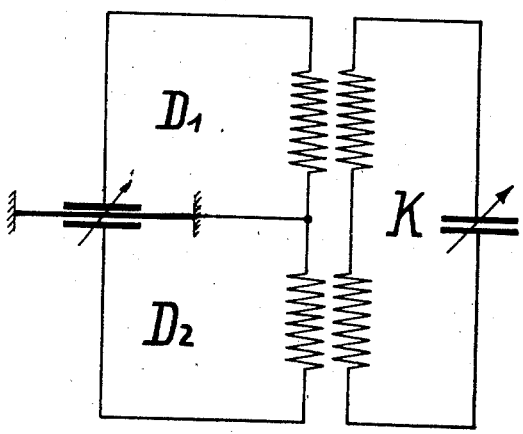

Figs. 1 and 2 show diagrammatically differential connections according to this invention.

Figs. $3^a$, $3^b$, $3^c$ are diagrams of curves relating to the connections shown by Figs. 1 and 2.

Figure 4:
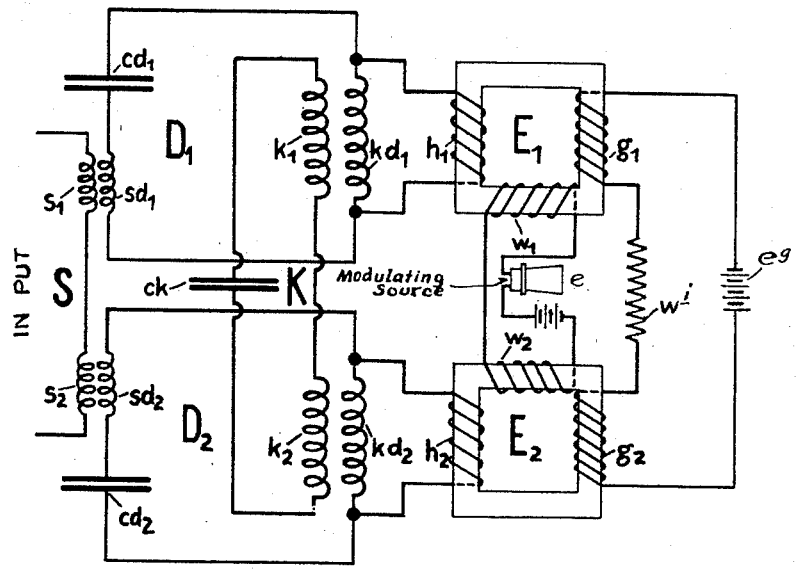
Figure 5:
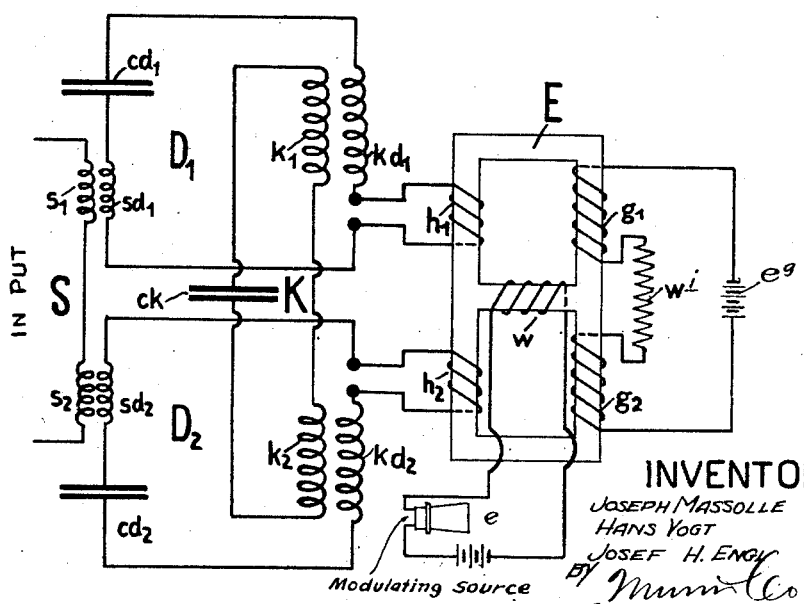

Figs. 4 and 5 show other modes of connection.

Figure 3A:
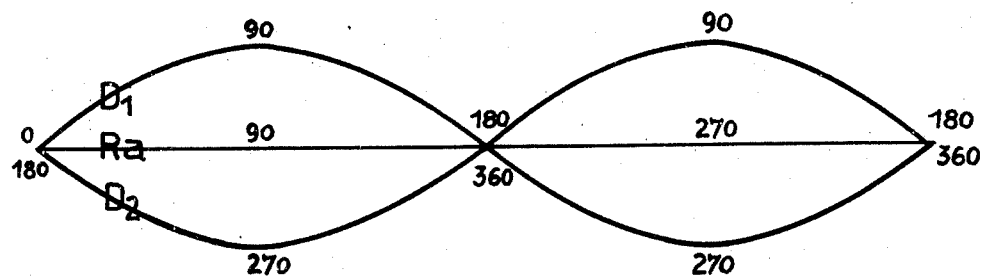
Figure 3B:
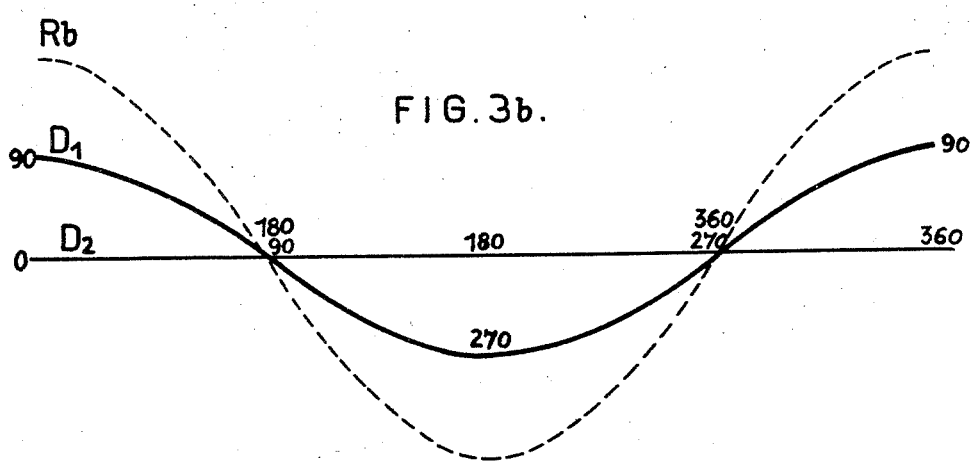
Figure 3C:
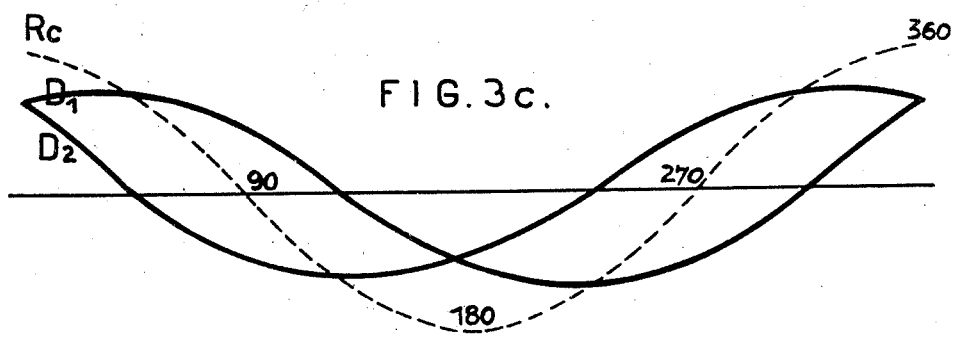

The tube R (Fig. 1) used as a generator produces high-frequency vibrations of constant amplitude in the high-frequency circuit S. Coupled to this circuit are two circuits $D_1$ and $D_2$, called differential circuits which are electrically exactly equivalent. They both take equal energy from the generating circuit S. Given exact-electrical equivalency of $D_1$ and $D_2$, the current phases of both circuits are in resonance, but their effects upon the circuit K, which is coupled to circuits $D_1$ and $D_2$ neutralize each other as they are displaced the one with regard to the other by 180° (Fig. $3^a$). When the electrical equality or balance of the circuits $D_1$ and $D_2$ is disturbed their respective current phases will be displaced the one with regard to the other and their differential effect will be transmitted to the circuit K. By opposite alteration of the capacity of $D_1$ and $D_2$ the current phases of the two circuits will be shifted for example in opposite directions. If, one phase is shifted for $+90°$ and the other for $-90°$, their effects on K will be in the same direction and they add themselves to produce the resultant $Rb$ (Fig. $3^b$). The alteration in the capacity necessary for this effect is small, so that the alteration in frequency of the circuits is not considerable. In Fig. 1 we have indicated diagrammatically variable capacities in circuits $D_1$ and $D_2$, to illustrate the principle of the invention, rather than any specific embodiment thereof. These capacities may be varied in correspondence with sound vibrations or otherwise, to modify the resultant effect in circuit K as stated. They may be varied, for example, by means of a condenser, which has one of its plates formed as a diaphragm, to constitute a condenser microphone, the diaphragm of which will vibrate in rhythm with acoustic vibrations received thereby, so that the capacity of the condenser microphone will vary correspondingly. A single condenser microphone may thus be connected to affect both circuits $D_1$ and $D_2$, as is indicated in Fig. 2. This method of connection offers the advantage that the condensers can be constructed for bilateral action, the membrane forming the common plate for the two condensers, as can be seen from Fig. 2. In this manner the advantage is ensured that the membrane is free from electro-static attractions, and may therefore be made so light that it can perfectly follow the acoustic vibrations. If the differential circuits are so disposed that, when the membrane is at rest, their effect on the circuit K is zero, the acoustic frequency is doubled since the membrane makes a deflection in each direction for each acoustic frequency, and produces in circuit K, by each deflection, an increase and decrease of the high frequency amplitudes while only single increases and decreases of the amplitudes should take place. For the purpose of speech reproduction, etc., it is therefore necessary to so untune the circuits $D_1$ and $D_2$ that their current phases are displaced from the outset, with relation to one another, by 90° (Fig. 3c). The current curve of circuit K at a state of rest corresponds then to the resultant R$c$, whose energy is half that of the resultant energy at phase equality according to Fig. 3b. The variations in the capacity of the microphone at maximum acoustic amplitudes are such that the phase displacement varies between 0° and 180° (Figs. 3a and 3b). The amplitude of the high frequency energy of the circuit K is then controlled by the acoustic vibrations between 0 and a maximum value.

In the method for the transfer of low frequency vibrations to the amplitude of high frequency vibrations which has just been described, the dependence of the current phase in oscillating circuits with forced excitation upon the resonance device is utilized to transfer acoustic vibrations by means of a condenser microphone to the amplitude of the high frequency current.

The connection hereinbefore described can however be improved so that it permits the transfer of low frequency alternating currents of any origin to the high frequency amplitude.

As shown by Figs. 4 and 5 the high frequency circuits $D_1$ and $D_2$, which have capacity and inductance $cd_1$, $kd_1$, $sd_1$ and $cd_2$, $kd_2$, $sd_2$, act in differential coupling on the circuit K, which has the inductances and capacity $k_1$, $k_2$, and $ck$. Condenser $ck$ may be omitted if circuit K is to be aperiodic. Circuits $D_1$ and $D_2$ are fed preferably with uniform intensity, by means of the circuit S, which may be an undamped high frequency generator, across the self inductions $s_1$ and $s_2$. K is then currentless so long as $D_1$ and $D_2$ are tuned to the same wave. The slightest disturbances of the tuning of $D_1$ and $D_2$ in opposite directions effect a proportionate, but with sufficiently small damping relatively great, displacements of the current phases in $D_1$ and $D_2$ whose difference becomes effective in K.

The alteration of the tuning in the ryhthm of the low frequency alternating current to be transferred is effected according to the invention by means of iron choke coils $E_1$ and $E_2$ (Fig. 4) or E (Fig. 5). These are provided with high frequency windings $h_1$ and $h_2$ which are inserted in the differential circuits by being mounted in parallel or in series and which determine the natural wave length of the differential circuits. As is well known, the influence of the iron upon the self-induction of the windings depends on the degree of its magnetic saturation. In consequence of this, in the case of non-saturated iron the self induction of the high frequency winding is considerably greater than in the case of iron which has been saturated. An alteration of the saturation by means of the superimposed low frequency current brings about consequently an alteration of the self-induction of $h_1$ and $h_2$, and thereby displacements of the current phases in $D_1$ and $D_2$, which, when they are in opposite directions, cause the production of a high frequency current in K, whose height of amplitude corresponds with the characteristic of the low frequency current.

The transferring of the low frequency current $e$ to the iron rings takes place across the windings $w_1$ and $w_2$, Fig. 4, and $w$, Fig. 5. In order to effect opposite alterations of the self-induction of $h_1$ and $h_2$ by means of this current a suitable premagnetization of the iron cores is necessary. For this purpose, for example, the source of direct current $eg$ is used which, by means of the windings $g_1$ and $g_2$, produces such a magnetic flux in the iron rings that the low frequency current $e$ causes an increase of the flux in one of the rings and a decrease in the other. In order to prevent the flow of alternating current in the circuit $eg$—$g_1$—$g_2$ caused by the coupling of the same with the alternating current windings, it is recommended that a resistance $wi$ be inserted in this circuit which may be either an inductive resistance or an ohmic resistance. The same applies to the low frequency circuit, if its resistance is too feeble for the coupling with the high frequency circuit.

As the greatest change of the self-induction takes place at the magnetizing knee, or elbow, (of the characteristic curve representing variations in intensity of magnetic flux in relation to the variations of magnetizing current,) it is an advantage to extend the premagnetization of the iron by means of source e. g., as far as the middle of the knee. Furthermore, irons with the sharpest possible knee are to be recommended. If the low frequency currents to be transferred must not be allowed to undergo a doubling of frequency, it is necessary to adjust $D_1$ and $D_2$ at a mean phase displacement. This can be effected by means of a suitable selection of the capacity and inductance of $D_1$ and $D_2$ (including $h_1$ and $h_2$) and also by the appropriate adjustment of the previous magnetization (different numbers of ampere turns for $g_1$ and $g_2$ or the superposition of a suitable direct current voltage in the low frequency circuit).

The low frequency currents to be laid on may be of various kinds, as for example, acoustic-electric currents, which can be produced with the aid of any microphone which is inserted in the low frequency circuit $ew_1$ $w_2$ (Fig. 4) or $ew$ (Fig. 5.). The source $e$ is indicated diagrammatically in Figs. 4 and 5 as a "modulating source", illustrated conventionally as a telephone transmitter in circuit with a source of direct current. The acoustically-modulated-electric high frequency currents which are thus induced, can be employed directly for the wireless telephony, or for other purposes, such as for example the photographic recording of sound-phenomena, in which case an electrically operated source of light is employed for recording.

We claim:—

1. In differential circuit devices, the combination of a pair of circuits having similar capacity and inductance, means for supplying alternating current equally thereto, the capacity-inductance products of said circuits being so adjusted in relation to each other that currents flowing therein will have a desired normal phase relation to each other, a third circuit so coupled with said first two circuits as to have a resultant normal current produced therein, and means for varying, as desired, the phase difference between the currents in said two circuits, to correspondingly alter the current in said third circuit.

2. In differential circuit devices, the combination of a pair of circuits having similar capacity and inductance, means for supplying alternating current equally thereto, the capacity-inductance products of said circuits being so adjusted in relation to each other that currents flowing therein will have a desired normal phase relation to each other, a third circuit so coupled with said first two circuits as to have a resultant normal current produced therein, and means for varying the phase relation between the currents in said two circuits in correspondence with sound vibrations, to correspondingly alter the current in said third circuit.

3. In differential circuit devices, the combination of a pair of circuits having similar capacity and inductance, means for supplying alternating current equally thereto, the capacity-inductance products of said circuits being so adjusted as to cause a normal phase difference of 90 degrees between the currents flowing therein, a third circuit so coupled with said first two circuits as to have a resultant normal current produced therein, and means for varying, as desired, the phase difference between the currents in said two circuits, to correspondingly alter the current in said third circuit.

4. In differential circuit devices, the combination of a pair of circuits having similar capacity and inductance, means for supplying alternating current equally thereto, the capacity-inductance products of said circuits being so adjusted as to cause a normal phase difference of 90 degrees between the currents flowing therein, a third circuit so coupled with said first two circuits as to have a resultant normal current produced therein, and means for varying the phase difference between the currents in said two circuits in correspondence with sound vibrations, to correspondingly alter the current in said third circuit.

5. In differential circuit devices, the combination of a pair of circuits having similar capacity and inductance, means for supplying high frequency alternating current equally thereto, the capacity-inductance products of said circuits, being so adjusted in relation to each other that currents flowing therein will have a desired normal phase relation to each other, a third circuit so coupled with said first two circuits as to have a resultant normal current produced therein, and means for relatively varying the capacity-inductance products of said first two circuits in correspondence with sound vibrations.

6. In differential circuit devices, the combination of a pair of circuits having similar capacity and inductance, means for supplying high frequency alternating current equally thereto, the capacity-inductance products of said circuits being so adjusted in relation to each other that currents flowing therein will have a desired normal phase relation to each other, a third circuit so coupled with said first two circuits as to have a resultant normal current produced therein, and means for relatively varying the inductances of said first two circuits in correspondence with sound vibrations.

7. In differential circuit devices, the combination of a pair of circuits having similar capacity and inductance, means for supplying high frequency alternating current equally thereto, the capacity-inductance products of said circuits being so adjusted in relation to each other that currents flowing therein will have a desired normal phase relation to each other, a third circuit so coupled with said first two circuits as to have a resultant normal current produced therein, and means for relatively varying the capacity-inductance products of said first two circuits at relatively low frequency.

8. In differential circuit devices, the combination of a pair of circuits having similar capacity and inductance, means for supplying alternating current equally thereto, the capacity-inductance products of said circuits being so adjusted as to cause a normal phase difference of 90 degrees between the currents flowing therein, a third circuit so coupled with said first two circuits as to have a resultant normal current produced therein, and means for relatively varying the capacity-inductance products of said first two circuits in correspondence with sound vibrations.

9. In differential circuit devices, the combination of a pair of circuits having similar capacity and inductance, means for supplying high frequency alternating current equally thereto, the capacity inductance products of said circuits being so adjusted in relation to each other that currents flowing therein will have a desired normal phase relation to each other, a third circuit so coupled with said first two circuits as to have a resultant normal current produced therein, the inductances in said first two circuits having iron cores, means for maintaining the magnetization of said cores at a desired point, and means for relatively varying the magnetization of said cores as desired, to thereby relatively vary the inductances of said first two circuits.

10. In differential circuit devices, the combination of a pair of circuits having similar capacity and inductance, means for supplying high frequency alternating current equally thereto, the capacity-inductance products of said circuits being so adjusted in relation to each other that currents flowing therein will have a desired normal phase relation to each other, a third circuit so coupled with said first two circuits as to have a resultant normal current produced therein, the inductances in said first two circuits having iron cores, means for maintaining the magnetization of said cores at a desired point of saturation, and means for relatively varying the magnetization of said cores in correspondence with sound vibrations.

In testimony whereof we affix our signatures.

JOSEPH MASSOLLE.
HANS VOGT.
Dr. JOSEF ENGL.